United States Patent [19]

Hougham et al.

[11] Patent Number: 5,523,776
[45] Date of Patent: Jun. 4, 1996

[54] PHOTOVOLTAIC ARRAY FOR COMPUTER DISPLAY

[75] Inventors: Gareth G. Hougham, Ossining; Alfred Viehbeck, Fishkill, both of N.Y.

[73] Assignee: International Business Machines Corporation, Armonk, N.Y.

[21] Appl. No.: 370,938

[22] Filed: Jan. 10, 1995

[51] Int. Cl.$^6$ .............................. G09G 5/00; H01L 31/04
[52] U.S. Cl. ...................... 345/211; 136/257; 136/291; 345/87; 359/896; 364/707
[58] Field of Search ................................ 136/257, 291, 136/293; 359/896; 320/2; 364/707; 345/87, 211

[56] References Cited

U.S. PATENT DOCUMENTS

| | | | |
|---|---|---|---|
| 4,017,725 | 4/1977 | Roen | 361/680 |
| 4,095,217 | 6/1978 | Tani et al. | 345/87 |
| 4,209,735 | 6/1980 | Yoshida | 320/2 |
| 5,039,928 | 8/1991 | Nishi et al. | 320/2 |
| 5,078,480 | 1/1992 | Warszawski | 359/265 |
| 5,260,885 | 11/1993 | Ma | 364/708.1 |

FOREIGN PATENT DOCUMENTS

| | | | |
|---|---|---|---|
| 58-149524 | 9/1983 | Japan | 136/291 |
| 3-45986 | 2/1991 | Japan | 136/291 |
| 4-362917 | 12/1992 | Japan . | |

*Primary Examiner*—Aaron Weisstuch
*Attorney, Agent, or Firm*—Perman & Green

[57] ABSTRACT

A display is constructed having a flat screen consisting of pixels which may be individually excited to create an image. The pixels are excitable between a light reflective and a transparent state in which they are visible in the reflective state and dark in the transparent state. A solar panel is mounted behind the flat screen to receive light transmitted by the transparent pixels. The solar panel converts the light to electric power to supplement the battery operation of the device.

4 Claims, 2 Drawing Sheets

PHOTOVOLTAIC ARRAY FOR COMPUTER DISPLAY

BACKGROUND OF THE INVENTION

The energy efficiency of portable computer devices has long been a focus of development.

Although battery operation has continuously improved, there is still a need for alternative sources of energy to supplement battery power. Solar energy devices have been employed in a variety of ways to prolong the available period of battery operation. One typical approach is shown in U.S. Pat. No. 5,260,885 in which extendable solar panels are provided to collect ambient radiant energy. This energy provides a supplemental source of electric power to assist in battery operation.

Japanese Patent No. 4-362917 describes an LCD display in which the solar panel is mounted behind the display to collect ambient light transmitted through the display. Although this configuration eliminates the need for cumbersome fold out panels, it does so in a manner which reduces the performance of the display. The LCD display is generally unsuitable for this application because of the inherent nature of the cells that create the image of the display. These cells or pixels alternate between visible and non-visible states depending on the excitation generated by the display in response to instructions from the computer. In the LCD display the light passes through the visible cell and is reflected by a reflective layer behind the cell or it is generated by a lamp behind the cell. The cell, therefore, must be transparent in order to be visible. The cells of an LCD display, therefore, alternate between light absorbing and light transmitting states. Since the performance of the solar panel also relies on transmitted light, it necessarily competes with the reflected light required for image definition on the display. This will erode the performance of the display.

It is the purpose of this invention to construct a display which allows the use of transmitted light to excite a photovoltaic cell and generate supplemental energy to improve battery operation without affecting the image definition capability of the: display. It is also the purpose of this invention to excite the photovoltaic cell during operation of the computer or other device.

SUMMARY OF THE INVENTION

A display is constructed having a flat screen consisting of pixels which may be individually excited to create an image. The pixels are excitable between a light reflective and a transparent state in which they are visible in the reflective state and dark in the transparent state. A solar panel is mounted behind the flat screen to receive light transmitted by the transparent pixels. The solar panel consists of a series of photovoltaic cells connected to convert the radiant energy impinging on its surface and convert it to electrical energy. The electrical energy may be supplied directly to power the display or to the battery supply to supplement the power to the computer and increase the period available for battery operation.

DESCRIPTION OF THE DRAWING

The preferred embodiment of this invention is described in more detail below in the attached drawing in which.

DESCRIPTION OF THE PREFERRED EMBODIMENT

Figure 1A:
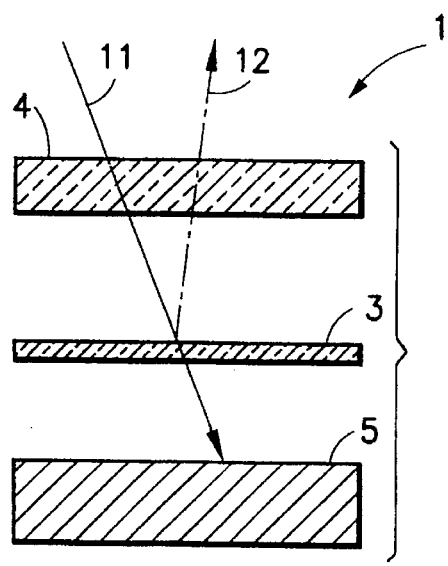
FIGS. 1a and 1b are schematic diagrams showing the dual states of the cells of the prior art in relation to the solar panel.
Figure 1B:
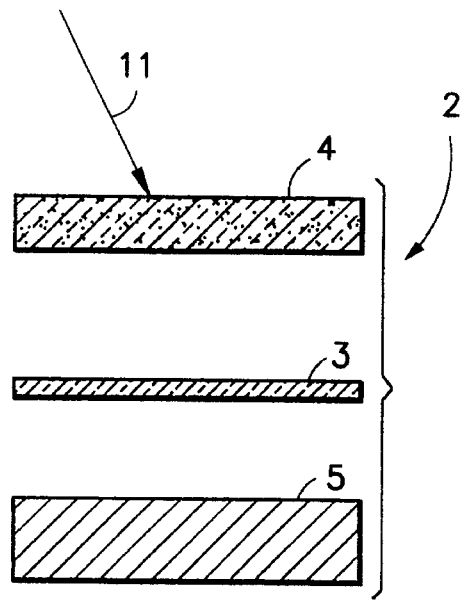

In the system of the prior art, as shown in FIG. 1, an individual image cell 4 has two states, a visible state 1 and a dark or invisible state 2. In the visible state 1 the incident light 11 is transmitted through the now transparent cell 4 to impinge upon reflective element 3. Element 3 is constructed to transmit a portion of light 11 and reflect a portion as indicated at 12. The reflected portion 12 comprises what is visible to the viewer and the transmitted portion is absorbed by the photovoltaic cell 5. In the dark state the incident light 11 is absorbed. It is clear that the performance of the image cell 4 and the effectiveness of the photovoltaic cell 5 will be compromised in the system of the prior art.

Figure 3:
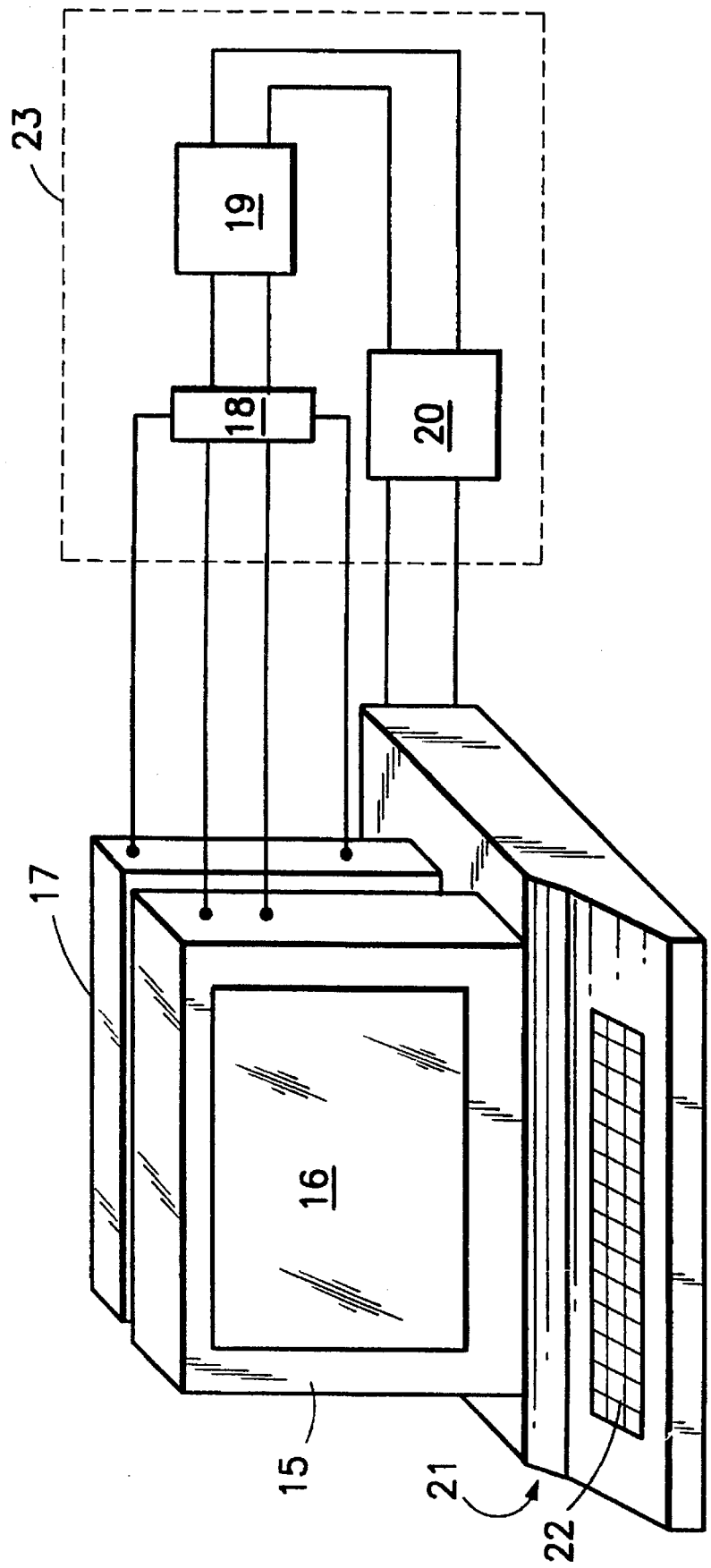
FIG. 3 is a schematic diagram of the system of this invention.

The system of this invention is shown in FIG. 3 and consists of a computer 21 which has a display 15 and a keyboard 22. The computer 21 is energized through power supply 23 consisting of battery pack 19, A-C power pack 20 and control unit 18. The display 15 consists of a screen 16 and solar panel 17 mounted behind the screen.

Figure 2A:
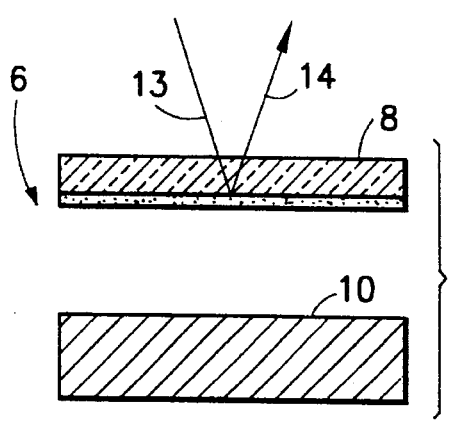
FIGS. 2a and 2b are schematic diagrams showing the dual states of the pixels of this invention in relation to the solar panel.
Figure 2B:
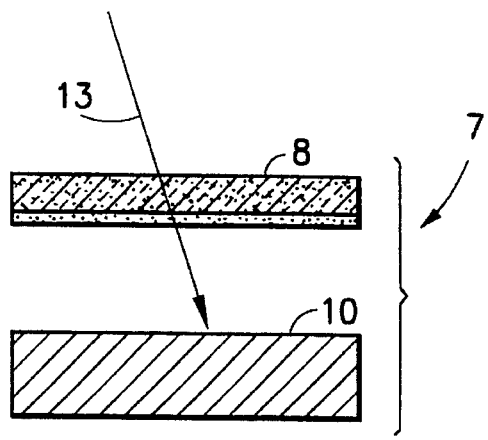

The screen 16 is an elaborate system of pixels 8 (FIG. 2) which are electrically excitable to provide an image on screen 16. The pixels 8 are excitable between a visible state 6 which it is reflective and a dark state 7 which is transparent as shown in FIGS. 2a and 2b. In the transparent state 7 (FIG.2b), all of the incident light 13 is transmitted to and absorbed by the photoelectric cell 10. When in the reflective state 6 (FIG. 2a), approximately all of incident light 13 is reflected as indicated at 14. The solar panel is mounted behind the screen 16 to receive light transmitted through the screen 16 and comprises a series of photovoltaic cells 10. A suitable photovoltaic device for this purpose is an amorphous silicon semiconductor cell of the type manufactured by Texas Instruments or Sanyo Corporation. This type of photovoltaic cell is more suited for office light conditions. In the event that the display device was to be used in direct sunlight, single crystal silicon cells would be more efficient. Each application would necessarily have to be considered in detail and the photovoltaic cell chosen to optimize its performance. In some instances, in particular photocells for use in low ambient light conditions, the cell may not be black but blue or violet. A filter may have to be employed having an absorption spectrum which; would absorb any light reflected from the photocell.

The electric power generated by the solar panel 17 is supplied through control unit 18 to the battery pack 19 or to the display screen 16 or both, depending on the amount of power generated. In this manner, this supplemental power may be used to extend the useful period of battery operation. It is observed that by using the light from pixels in the dark transparent state 7, the effectiveness of the solar panel 17 may be maximized without effecting the definition of the image on the screen 16. In fact, the light absorption of the photovoltaic cells 10 actually will enhance the contrast of the screen.

The pixels of the type used in this invention may be constructed by reversible electrodeposition of reflective metals as shown in U.S. Pat. No. 5,078,480 or by PSCT, polymer stabilized cholesteric texture. The critical feature of the pixels 8 used in this invention is that they be transparent in the dark state, the opposite of the LCD cells of the prior art.

In operation there is always a significant proportion of pixels 8 in the dark state 7 to provide light energy to photovoltaic cell 10. On typical text images it is estimated that as much as 40% of the screen will be transparent. This allows the solar panel to generate supplemental power during computer operation without interfering with the performance of the display. The Photoelectric cell will also be fully operational over 100% of the screen when the display is not in use. This system, although particularly applicable to portable computers having battery operation, can be readily adapted to any electrical device that uses a display of the type indicated above.

What is claimed as our invention is:

1. A display panel for a computer comprising:

panel means to generate an image through the electrical excitation of a plurality of pixels, each said pixel being excitable between two states, one state in which the pixel is transparent and dark and a second state in which the pixel is reflective and visible; and means operatively associated with the pixel to receive light energy transmitted through said pixel in said transparent state and convert said transmitted light energy into electric energy.

2. A display panel for a computer as described in claim 1 wherein the means for converting light energy is at least one photovoltaic cell.

3. A system for supplying supplemental power to an electrical device which utilizes a display, comprising:

a display a screen constructed of a plurality of pixels, each said pixel being excitable between two states, one state in which the pixel is transparent and dark and a second state in which the pixel is reflective and visible;

a solar panel constructed of at least one photovoltaic cell, said panel mounted behind the screen to receive light transmitted through the transparent pixels of the screen and convert the transmitted light energy into electric energy; and a power supply connected to the solar panel to receive the electric energy therefrom and apply it to the electrical device.

4. A system for supplying supplemental power to an electrical device which utilizes a display as described in claim 3 wherein the states of the pixels are formed by the process of reversible electroplating.

* * * * *